United States Patent [19]

Rixon

[11] 4,253,712
[45] Mar. 3, 1981

[54] SELF ALIGNING ROLLING ELEMENT BEARING

[76] Inventor: Rupert K. Rixon, 537 Main Rd., Wellington Point, Queensland, Australia

[21] Appl. No.: 46,674

[22] Filed: Jun. 8, 1979

[30] Foreign Application Priority Data

Jun. 8, 1978 [AU] Australia ............................ 36931/78

[51] Int. Cl.³ .............................................. F16C 19/08
[52] U.S. Cl. .................................. 308/183; 308/189 R; 308/194; 308/207 R; 308/216; 308/214
[58] Field of Search ................... 308/183, 189 R, 194, 308/207 R, 214, 216, 174

[56] References Cited

U.S. PATENT DOCUMENTS

| 2,822,225 | 2/1958 | Teufel | 308/183 |
| 4,010,986 | 3/1977 | Otto | 308/189 R |
| 4,179,167 | 12/1979 | Lura et al. | 308/194 |

Primary Examiner—Lenard A. Footland
Attorney, Agent, or Firm—McAulay, Fields, Fisher, Goldstein & Nissen

[57] ABSTRACT

A self aligning rolling element bearing assembly for supporting a shaft rotatable about its longitudinal axis. A carrier member is adapted to be supported within the housing both on and concentric with the shaft, and the carrier member has spaced concentric spherical bearing surfaces at opposite sides thereof. A pair of co-axial rolling element bearing assemblies are disposed at opposite sides of and concentric with the bearing surfaces. Each of the bearing assemblies includes a plurality of rolling elements supported operatively between a fixed raceway in the housing and a respective one of the spherical bearing surfaces.

9 Claims, 5 Drawing Figures

SELF ALIGNING ROLLING ELEMENT BEARING

This invention relates to an improved self aligning rolling element bearing.

Self aligning bearings are wisely used in industry in installations where it is not possible to accurately align or to maintain accurate alignment between a rotating shaft and its supporting bearing. A typical example is the bearings supporting the end of a screw flight of an auger assembly such as used in conveying grain and the like. Such screws may rotate at a speed of up to 800 r.p.m. and in installations having long conveying distances, the screw flight is relatively flexible and the opposite supporting ends of the shaft are not maintained in constant alignment with the respective supporting bearings. As a result, the presently available bearings utilised in such installations wear quickly as they have relatively low thrust loading properties but high centering factors.

The present invention has been devised to provide an improved self aligning rolling element bearing which will overcome the above and other disadvantages and which will prove reliable and efficient in operation. Other objects and advantages of the invention will become apparent from the following description.

With the foregoing and other objects in view, this invention resides broadly in a self aligning rolling element bearing assembly adapted to support a shaft rotatable about its longitudinal axis and including: a housing; a carrier member adapted to be supported within said housing on and concentric with said shaft and said carrier member having spaced concentric spherical bearing surfaces at opposite sides thereof, and a pair of co-axial rolling element bearing assemblies disposed at opposite sides of and concentric with said bearing surfaces and each said bearing assembly including a plurality of rolling elements supported operatively between a fixed raceway in said housing and a respective said spherical bearing surface.

In order that the invention may be more readily understood and put into practical effect, reference will now be made to the accompanying drawings which illustrate a preferred embodiment of the invention and wherein.

Figure 1:
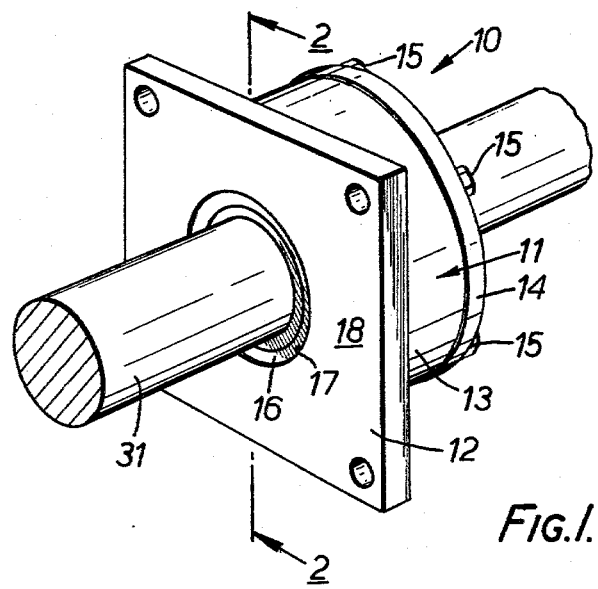
FIG. 1 is a perspective view of a bearing assembly according to this invention.

The bearing assembly 10 of the present invention includes a support housing 11 which is preferably a machined casting having a flanged mounting face 12 at one end to enable the bearing to be bolted to its supporting member and an open ended part cylindrical extension portion 13 within which the operative components of the bearing are supported and retained by a closure plate 14 adapted to be secured to the housing 11 by bolts 15, as illustrated.

Figure 2:
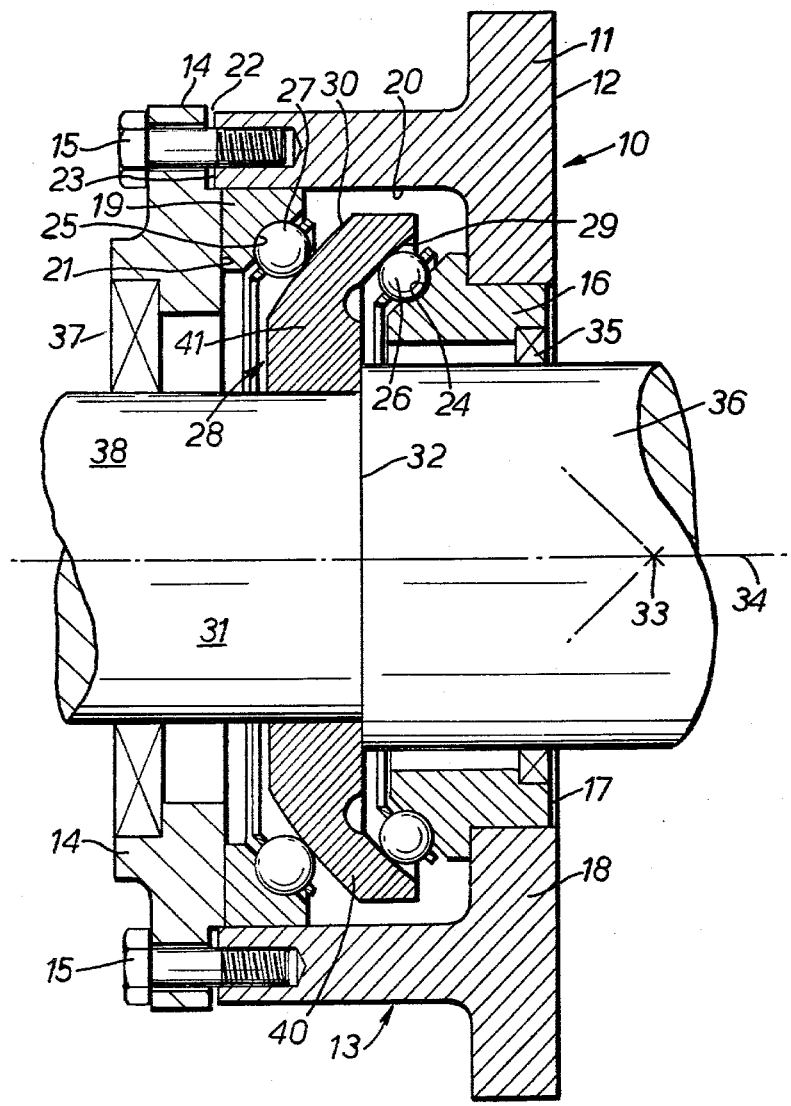
FIG. 2 is a cross-sectional view taken along the line 2—2 of FIG. 1 and illustrating the internal configuration thereof.

As shown in the cross-sectional views, a grooved cone ring 16 is pressed into an aperture 17 provided in the back wall 18 of the housing and a cup ring 19 is supported within the extension portion 13 around the inner surface 20 thereof, and the cup ring 19 is adapted to abut against the innermost face 21 of the closure plate 14 whereby its axial position within the housing, and thus its preloading may be adjusted during assembly by providing shims (not shown) supported between the relieved peripheral portion 22 of the closure plate 14 and the end face 23 of the housing 11. The cone ring 16 is provided with a circumferential raceway groove 24 extending therearound for locating a caged ball bearing assembly 26, and the cup ring 19 is correspondingly grooved at 25 for locating a larger diameter caged ball bearing assembly 27. The raceway grooves 24 and 25 are co-axial and axially spaced apart as shown. A carrier member, which in this embodiment comprises a floating thrust disc 28 having an outer portion in the form of a part spherical flange, the inner and outer annular portions of which form spherical bearing surfaces 29 and 30 respectively, is interposed between the ball bearings assemblies 26 and 27 and this disc is supported about the shaft 31 to abut against the collar 32 machined in the shaft 31 for location purposes, whereby the centre of rotation 33 of the concentrically arranged spherical bearing surfaces 29 and 30 is coincident with the axis of rotation 34 normal to the bearing assembly and passing through the axes of said raceway grooves 24 and 25. Thus the shaft axis 34a which is normally coincident with the rotational axis 34 may pivot about the centre of rotation 33 as illustrated in FIG. 2.

The outer end of the cone ring 16 is recessed for a flexible seal 35 adapted to seal against the larger diameter shaft portion 36, while the closure plate 14 is correspondingly recessed for a flexible seal 37 adapted to seal against the smaller diameter shaft portion 38. In this embodiment the cone surface and the cup surface in which the respective raceways 24 and 25 are formed are both arranged at 45 degrees to the rotational axis 34 and the caged ball bearing assembly 27 supported within the cup 19 is a larger diameter than the caged ball bearing assembly 26 supported about the cone 16 to facilitate self centering of the thrust disc 28. All bearing surfaces are ground in known manner and are formed of desired material depending on the application, such as hardened steel, and of course the bearings are lubricated by a suitable lubricant retained in the housing.

Figures 4, 5:
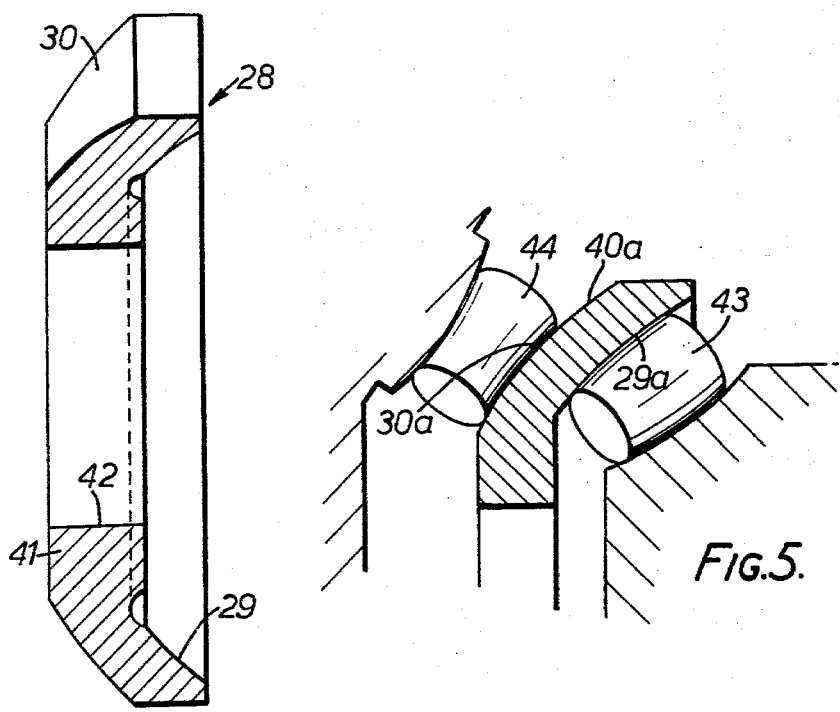
FIG. 4 illustrates the pivotable thrust plate of the bearing assembly in partial cross section.
FIG. 5 illustrates the application of roller bearings to the present invention.

FIG. 4 illustrates the thrust disc 28 partially broken away to show the part spherical outer flange portion 40 providing the outer spherical bearing surface 30 and the inner spherical bearing surface 29. The hub portion 41 is bored at 42 and ground to enable it to be pressed tightly about the shaft 31.

Figure 3:
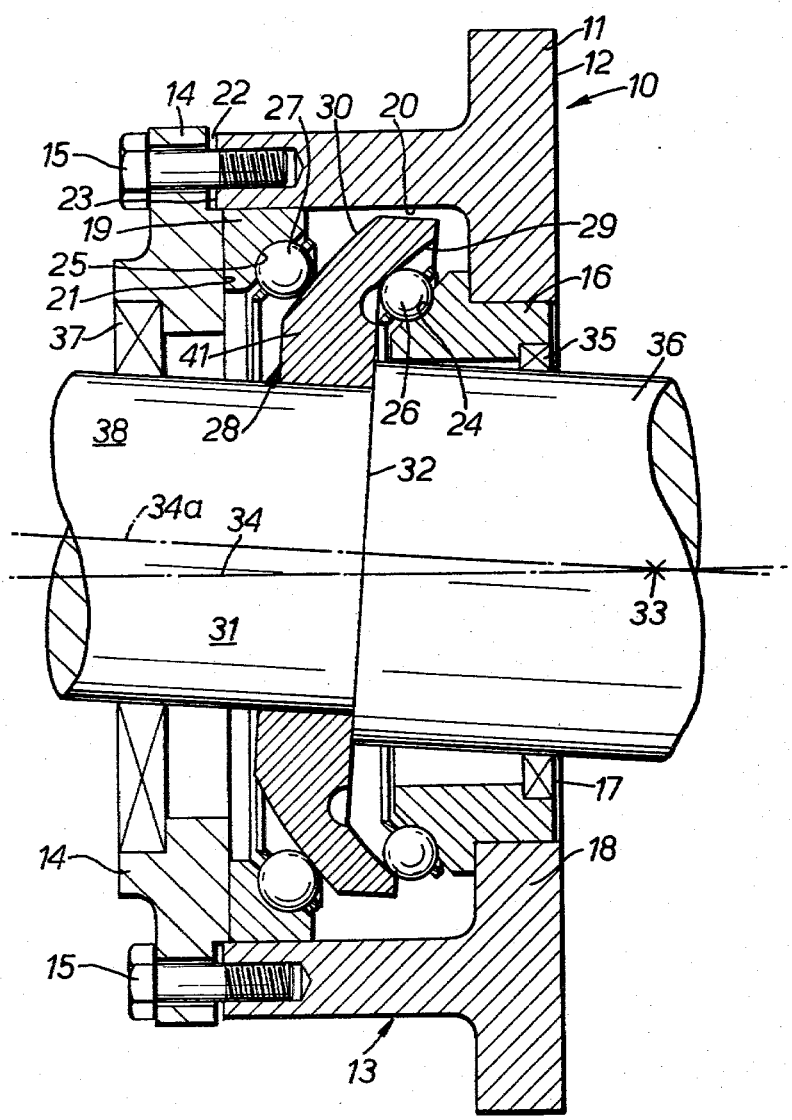
FIG. 3 is a view similar to FIG. 2 but showing the support shaft in an exaggerated deflected position.

In operation, it will be seen that the respective ball bearing assemblies 26 and 27 rotate about fixed axes as they are retained for rotation around the respective raceways 24 and 25 in the cone ring and cup ring respectively. However, at all times the shaft 31 which is fixed only to the floating thrust disc 28 may rotate and move off-centre confined by the geometry of the bearing surfaces 29 and 30, the instantaneous centre of rotation of which is maintained coincident with the rotational axis 34 by constraint between the oppositely arranged ball bearing assemblies 26 and 27. Thus, the shaft 26 can, in operation, deflect without a detrimental effect on the load carrying or rotational speed capabilities of the bearing as the relationship between the ball bearings and their point of contact with the respective spherical bearing surfaces of the thrust disc remains constant. As shown clearly in FIG. 3, the shaft may deflect through a relatively large angle in operating conditions and deflection of the shaft will cause the portions of the shaft at opposite sides of the instantaneous centre 33, to move to opposite side of the rotational axis 34.

FIG. 5 illustrates the application of roller bearings to the bearing assembly. As shown, the part spherical outer portion 40a of the thrust disc is identical to the previous embodiment but the inner and outer rollers 43 and 44 respectively are shaped to conform with the respective bearing surfaces 29a and 30a respectively. Of course, the fixed raceway for the outer bearing would be in the form of a raised annular rim having a convex outer surface to locate the respective rollers.

While the above has been given by way of illustrative example, it will be realised that all such modifications and variations as would be apparent to persons skilled in the art are deemed to fall within the broad scope and ambit of the invention as is defined in the appended claims.

I claim:

1. A self aligning rolling element bearing assembly adapted to support a shaft rotatable about its longitudinal axis and including: a housing; a carrier member adapted to be supported within said housing on and concentric with said shaft and said carrier member having spaced concentric spherical bearing surfaces at opposite sides thereof, and a pair of co-axial rolling element bearing assemblies disposed at opposite sides of and concentric with said bearing surfaces and each said bearing assembly including a plurality of rolling elements supported operatively between a fixed raceway in said housing and a respective said spherical bearing surface.

2. A self aligning rolling element bearing assembly according to claim 1, wherein said fixed raceways are formed in respective surfaces inclined at substantially 45 degrees to their common axis of rotation.

3. A self aligning rolling element bearing assembly according to claim 2, wherein said carrier member comprises a disc having an outer portion in the form of a part spherical flange, the opposite side faces of which constitute said spherical bearing surfaces.

4. A self aligning rolling element bearing assembly according to claim 3, wherein the diameter of said bearing assembly supported against the innermost said spherical bearing surface is smaller than the diameter of said bearing assembly supported against the outer said spherical bearing surface.

5. A self aligning rolling element bearing assembly according to claim 4, wherein said fixed raceway for said innermost bearing is formed in a cone ring and said fixed raceway for said outer bearing is formed in a cup ring.

6. A self aligning rolling element bearing assembly according to claim 5, wherein said bearing assemblies are ball bearing assemblies.

7. A self aligning rolling element bearing assembly according to claim 5, wherein said bearing assemblies are roller bearing assemblies.

8. A self aligning rolling element bearing assembly according to claim 5, wherein said cup ring and said cone ring are adapted to be pressed into said housing and are provided with recesses for retention of a shaft seal.

9. A self aligning rolling element bearing assembly according to claim 8, wherein said housing is substantially cylindrical and is provided with a flange mounting at the end thereof supporting said cone ring and wherein the other end of said housing is open and is adapted to be closed by a cover plate adapted to bear against said cup ring and being axially adjustable.

* * * * *